Patented Sept. 9, 1941

2,255,229

UNITED STATES PATENT OFFICE 2,255,229

SOLVENT FOR ORGANIC FILM-FORMING MATERIALS

Walter Reppe and Otto Hecht, Ludwigshafen-on-the-Rhine, and Fritz Oschatz, Mannheim, Germany, assignors, by mesne assignments, to General Aniline & Film Corporation, New York, N. Y., a corporation of Delaware No Drawing. Application February 8, 1939, Serial No. 255,217. In Germany February 18, 1938

3 Claims. (Cl. 260—32)

This invention relates to solvents for organic film-forming materials, especially those applicable to the manufacture of plastic masses, lacquers, priming compositions, covering colors, adhesives, foils, films, bands of artificial threads.

We have found that tetrahydrofurane and certain of its alkyl substitution products have an excellent solvent for organic film-forming substances which are used as basic substances for lacquers and other plastic masses, such as cellulose esters and ethers, polymerized vinyl compounds and the like and that these tetrahydrofuranes are also solvents for gums and resins used in lacquers. They are also compatible with other ingredients in commercial use in the preparation of lacquers, as for example with softening agents, plasticizers and the like.

The tetrahydrofuranes used as solvents according to our invention have the following formula:

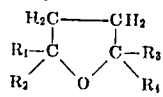

in which $R_1$, $R_2$, $R_3$ and $R_4$ are hydrogen or low molecular aliphatic hydrocarbon radicles. The most simple member of this series is tetrahydrofurane itself, which is miscible both with water and with organic solvents, as for example with aromatic hydrocarbons and, therefore, is a very desirable solvent in the preparation of compositions of matter and plastic compositions containing polymerized vinyl compounds or cellulose esters. By the selection of the alkyl substituents in the tetrahydrofurane radicle it is possible to vary the solvent capacity, volatility, water-solubility of the substance according to desire. Suitable alkyl substitution products are for example 2.5-dimethyltetrahydrofurane and 2.2.5.5-tetramethyltetrahydrofurane.

Tetrahydrofurane is suitable for example for dissolving natural and synthetic resins, as for example manila copal, colophony or phenolaldehyde resins, etherified urea resins, such as are obtained for example by condensation of urea with formaldehyde or of dimethylol urea in alcohols, condensation products of resin acids or their esters with maleic acid, cumarone resins, and alkyd resins of various kinds. They also dissolve cellulose derivatives, i. e. cellulose esters, as for example nitrocellulose and organic cellulose esters, cellulose ethers, as for example ethyl or benzyl cellulose, cellulose ether esters, and also rubber and rubber-like substances, as for example polymerized isoprene or butadiene, their chlorination products and also rubber isomerisation products.

Tetrahydrofurane may also especially be used for dissolving synthetic vinyl polymerization products, such as polyvinyl chloride, polyvinyl esters of organic acids, as for example polyvinyl acetate, polyvinyl ethers, polyvinyl carbazole, and also polyacrylic acid and polymethacrylic acid and their derivatives and interpolymerization products of different vinyl compounds. Tetrahydrofurane also has a good solvent power for the waxes and drying oils used in the preparation of lacquers, as for example linseed oil, wood oil, oiticica oil or root oil, and also for the fundamental substances used in the preparation of asphalt lacquers.

The solutions thus prepared may have added to them the usual softening agents and also to a large extent adulterants. Thus for example solutions of acetyl cellulose in tetrahydrofurane may be even diluted with alcohol. Many of the dye-stuffs used for coloring lacquers also have a good solubility in tetrahydrofuranes. Insoluble organic or inorganic fillers may, however, also be added to the lacquers.

The use of tetrahydrofurane as a solvent is very advantageous. It is stable and colorless, thereby being suitable for the production of clear or light colored lacquers and plastic compositions. It will be obvious from the foregoing explanations that it is possible according to our present invention to vary the properties of the compositions within very wide limits, and to fulfill all requirements of practice, for example the hardness, the time required for drying and the like. The possibility of using tetrahydrofurane as a solvent for vinyl polymerization products, such as polyvinyl chloride, polyvinyl carbazole and interpolymerization products of vinyl chloride and arcylic acid esters, for which no satisfactory solvents have hitherto been available, should be specially emphasized.

The following examples will further illustrate how this invention may be carried out in practice, but the invention is not restricted to these examples. The parts are by weight.

*Example 1*

15 parts of a polyvinyl chloride which is not soluble without objection in esters or benzene hydrocarbons are dissolved in 85 parts of tetrahydrofurane. The clear solution thus obtained dries to give transparent films which are very stable to benzine and benzene hydrocarbons and also to alcohol. In order to increase the elasticity, softening agents, such as chlorinated diphenyl, phthalic acid esters or phosphoric acid esters, may be added. The hardness and adherence of the films may be increased by the addition of resins, as for example condensation products of cyclic ketones, alkyd resins, maleic acid-colophony-glycerine esters. The lacquers may also be colored in the usual way with pigments or soluble dyestuffs.

Example 2

10 parts of polyvinyl carbazole are dissolved in 90 parts of tetrahydrofurane. The lacquer thus obtained is eminently suitable for impregnating paper and cardboard which are distinguished by especially valuable electrical properties.

Example 3

20 parts of polyvinyl isobutyl ether are dissolved in 80 parts of tetrahydrofurane. A very rapidly drying adhesive is obtained to which softening agents or resins may be added in order to improve the sticking power.

Instead of tetrahydrofurane, there may be used an equal amount of 2.2.5.5-tetramethyl-tetrahydrofurane. The solution obtained may be used as adhesive which shows excellent sticking power.

Example 4

20 parts of an interpolymerization product of 80 parts of polyvinyl chloride and 20 parts of acrylic acid butyl ester which is not completely soluble in esters or benzene hydrocarbons are dissolved in 80 parts of tetrahydrofurane. A solution is obtained which, if necessary after the usual filtration, is eminently suitable for the preparation of films, as for example with the aid of a film casting machine.

Example 5

20 parts of a polyvinyl chloride which is not completely soluble in esters or benzene hydrocarbons are dissolved in 80 parts of tetrahydrofurane. This solution has added to it from 10 to 15 parts of tricresyl phosphate and is triturated in the usual way with pigments. A pasty mass is obtained which is eminently suitable as a printing or covering coating in the preparation of substances similar to artificial leather.

Example 6

25 parts of an after-chlorinated polyvinyl chloride containing 63 per cent of chlorine which is more than corresponds to the formula

$(CH_2CHC)_x$ are dissolved in 75 parts of tetrahydrofurane and the solution is filtered in the usual way. The resulting solution is suitable for example for the preparation of artificial silk by the dry-spinning method.

Other products suitable for the preparation of artificial silk, such as acetyl cellulose, may be used instead of polyvinyl chloride.

Example 7

30 parts of a resin of the Resol type prepared by condensation of 1 molecular proportion of cresol with 1.25 molecular proportions of formaldehyde with the addition of ammonia as a condensing agent are dissolved in 50 parts of tetrahydrofurane and 20 parts of butyl acetate to give a clear lacquer. After evaporation of the solvent it yields a lacquer film of good course which can be hardened by burning in for 2 hours at 120° C. to give a hard resin which is resistant to acid.

When importance is attached to rapid evaporation of the solvent, the resin capable of being hardened may be dissolved in tetrahydrofurane alone.

Example 8

30 parts of a resinous condensation product obtained by the condensation of 1 molecular proportion of para-tertiary-butyl-phenol with 2 molecular proportions of formaldehyde and caustic soda solution acccording to the German specification No. 340,989 are heated for 15 minutes with 90 parts of Chinese wood oil at from 215° to 225° C. The resulting lacquer body is cooled to about 100° C., 40 parts of test benzine (boiling range 150° to 180° C.) are added and, after further cooling, 40 parts of tetrahydrofurane are added. The oil lacquer thus obtained yields, after application, coatings which dry much more rapidly and with considerably better course than those in which test benzine alone has been used as the solvent. Instead of the abovementioned resin, there may also be used the other resins used in oil lacquar technique, and linseed oil, stand oil, and oiticica oil may be used instead of wood oil.

What we claim is:

1. A composition of matter comprising a polymerized mono vinyl compound dissolved in tetrahydrofurane.

2. A composition of matter comprising a polymerized vinyl ester dissolved in tetrahydrofurane.

3. A composition of matter comprising a vinyl chloride polymer dissolved in tetrahydrofurane.

WALTER REPPE.
OTTO HECHT.
FRITZ OSCHATZ.